US012657557B2

(12) United States Patent
Purandare et al.

(10) Patent No.: US 12,657,557 B2
(45) Date of Patent: Jun. 16, 2026

(54) CARBON NEUTRAL BLOCKCHAIN PROTOCOL FOR RESOLVING CARBON OFFSETTER PAYMENTS FOR CRYPTOCURRENCY TRANSACTIONS

(71) Applicant: PayPal, Inc., San Jose, CA (US)

(72) Inventors: Sujay Vijay Purandare, Portland, OR (US); Charles Gabriel Neale Dalton, San Jose, CA (US); Michael Charles Todasco, Santa Clara, CA (US); Norihiro Edwin Aoki, Woodside, CA (US); Suryatej Gundavelli, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 40 days.

(21) Appl. No.: 18/217,526

(22) Filed: Jun. 30, 2023

(65) Prior Publication Data

US 2023/0342735 A1     Oct. 26, 2023

Related U.S. Application Data

(63) Continuation of application No. 17/403,755, filed on Aug. 16, 2021, now Pat. No. 11,727,365.

(51) Int. Cl.
*G06Q 20/06*          (2012.01)
*G06Q 20/36*          (2012.01)
*G06Q 20/38*          (2012.01)

(52) U.S. Cl.
CPC ......... *G06Q 20/065* (2013.01); *G06Q 20/363* (2013.01); *G06Q 20/3825* (2013.01); *G06Q 20/3827* (2013.01); *G06Q 20/3829* (2013.01)

(58) Field of Classification Search
CPC .............. G06Q 20/065; G06Q 20/363; G06Q 20/3825; G06Q 20/3827; G06Q 20/3829
(Continued)

(56) References Cited

U.S. PATENT DOCUMENTS

| | | | |
|---|---|---|---|
| 10,841,372 B1 | 11/2020 | Ram et al. | |
| 10,915,891 B1 | 2/2021 | Winklevoss et al. | |
(Continued)

FOREIGN PATENT DOCUMENTS

| | | | |
|---|---|---|---|
| KR | 102331039 B1 | * | 11/2018 |
| KR | 101914576 B1 | * | 12/2021 |
(Continued)

OTHER PUBLICATIONS

Truby J. Decarbonizing Bitcoin: Law and policy choices for reducing the energy consumption of Blockchain technologies and digital currencies. Energy research & social science. Oct. 1, 2018;44:399-410. (Year: 2018).*
(Continued)

*Primary Examiner* — Sara C Hamilton
(74) *Attorney, Agent, or Firm* — Haynes and Boone, LLP

(57)          ABSTRACT

There are provided systems and methods for a carbon neutral blockchain protocol for resolving carbon offsetter payments for cryptocurrency transactions. A service provider, such as an online transaction processor, may provide a green wallet and network protocol that provides carbon offsetting fees and payments to carbon offsetters in order to account for carbon emissions and usage when processing cryptocurrency transactions on a blockchain network protocol. A green wallet may be provided, which allows registration of carbon offsetters and use of green addresses to cause cryptocurrency to be processed in a green transaction. A user's digital wallet may sign an initial cryptocurrency transaction and provide the fee to the green wallet. The green wallet may then resolve the cryptocurrency transaction by further signing the transaction and transmitting the fee to a digital wallet of the carbon offsetter over another cryptocurrency processing network.

20 Claims, 7 Drawing Sheets

(58) Field of Classification Search
    USPC ......................................................... 705/44
    See application file for complete search history.

(56) References Cited

U.S. PATENT DOCUMENTS

| | | | |
|---|---|---|---|
| 10,983,958 | B1 | 4/2021 | Miller et al. |
| 11,157,898 | B2 | 10/2021 | Mutter |
| 11,200,569 | B1 | 12/2021 | James et al. |
| 11,501,370 | B1 | 11/2022 | Paya et al. |
| 2015/0294308 | A1 | 10/2015 | Pauker et al. |
| 2016/0300222 | A1 | 10/2016 | Yang |
| 2017/0180128 | A1 | 6/2017 | Lu |
| 2018/0109541 | A1 | 4/2018 | Gleichauf |
| 2019/0108498 | A1 | 4/2019 | Deshpande et al. |
| 2019/0164236 | A1 | 5/2019 | Mayne et al. |
| 2019/0199516 | A1 | 6/2019 | Carver et al. |
| 2019/0220858 | A1 | 7/2019 | Weight et al. |
| 2019/0236298 | A1 | 8/2019 | Agarwal |
| 2019/0236594 | A1 | 8/2019 | Ehrlich-Quinn |
| 2019/0237169 | A1 | 8/2019 | Culver et al. |
| 2019/0305956 | A1 | 10/2019 | Irani, III |
| 2020/0027096 | A1 | 1/2020 | Cooner |
| 2020/0074424 | A1 | 3/2020 | Motylinski et al. |
| 2020/0082360 | A1 | 3/2020 | Regev |
| 2020/0084027 | A1 | 3/2020 | Duchon et al. |
| 2020/0097950 | A1 | 3/2020 | Thompson |
| 2020/0111105 | A1 | 4/2020 | Gupta et al. |
| 2020/0220717 | A1 | 7/2020 | Alness et al. |
| 2020/0387893 | A1 | 12/2020 | Maim |
| 2021/0021424 | A1 | 1/2021 | Punal et al. |
| 2021/0049591 | A1 | 2/2021 | Lamesh |
| 2021/0142426 | A1 | 5/2021 | Miller et al. |
| 2021/0151202 | A1 | 5/2021 | Jabbar et al. |
| 2021/0166223 | A1 | 6/2021 | Moiyallah, Jr. et al. |
| 2021/0176041 | A1 | 6/2021 | Subra Girish |
| 2021/0192473 | A1 | 6/2021 | Meehan |
| 2021/0226800 | A1 | 7/2021 | Cao et al. |
| 2021/0297255 | A1 | 9/2021 | Wan et al. |
| 2021/0304197 | A1 | 9/2021 | Pomassl et al. |
| 2021/0314143 | A1 | 10/2021 | Conner |
| 2021/0334176 | A1 | 10/2021 | Sears et al. |
| 2021/0390549 | A1 | 12/2021 | Rule et al. |
| 2022/0044229 | A1 | 2/2022 | Mutter |
| 2022/0084013 | A1 | 3/2022 | Kulkarni et al. |
| 2022/0129888 | A1 | 4/2022 | Wright et al. |
| 2022/0166616 | A1 | 5/2022 | Manevich et al. |
| 2022/0318907 | A1 | 10/2022 | Bleznak et al. |
| 2023/0042916 | A1 | 2/2023 | Sole et al. |
| 2023/0169062 | A1 | 6/2023 | Htay |
| 2023/0169510 | A1 | 6/2023 | Koh |
| 2023/0229813 | A1 | 7/2023 | Mattila et al. |
| 2023/0274262 | A1 | 8/2023 | Gujar et al. |
| 2024/0152925 | A1 | 5/2024 | Edwards et al. |
| 2024/0193684 | A1* | 6/2024 | Bai ...................... G06Q 30/018 |
| 2025/0148435 | A1 | 5/2025 | K et al. |

FOREIGN PATENT DOCUMENTS

| | | | |
|---|---|---|---|
| WO | 2020150741 | A1 | 7/2020 |
| WO | 2021144479 | A1 | 7/2021 |

OTHER PUBLICATIONS

"Blockchain technology in the energy sector: A systematic review of challenges and opportunities," by Merlinda Andoni; Valentin Robu; David Flynn; Simone Abram; Dale Geach; David Jenkins; Peter Mccallum; and Andrew Peacock. Renewable and Sustainable Energy Reviews 100 (2019). pp. 143-174. (Year: 2019).

"Bitcoin-based decentralized carbon emissions trading infrastructure model," by Enas Al Kawasmi; Edin Arnautovic; and Davor Svetinovic. Systems Engineering, 18(2) (2015). pp. 115-130. (Year: 2015).

"Cryptocurrency and Era of Digital Currency," by Manishaben Jaiswal. Published 2020. (Year: 2020).

"Hash Time Locked Contracts," Jan. 23, 2025, [retrieved from Internet on] https://en.bitcoin.it/w/index.php?title=Hash_Time_Locked_Contracts&oldid=61789%3E, published on Nov. 6, 2016, 0 pages.

International Preliminary Report on Patentability for Application No. PCT/US2022/043504 mailed on Apr. 18, 2024, 8 pages.

International Search Report and Written Opinion for Application No. PCT/US2022/43504 mailed on Jan. 3, 2023, 18 pages.

International Search Report and Written Opinion for Application No. PCT/US2023/083659 mailed on Apr. 2, 2024, 12 pages.

International Search Report and Written Opinion for Application No. PCT/US24/44845, Dec. 4, 2024, 13 pages.

Aumayr L., et al., "Blitz: Secure Multi-Hop payments without Two-Phase commits," 30th USENIX Security Symposium, Aug. 11-13, 2021.

International Preliminary Report on Patentability for Application No. PCT/US2023/083659, mailed on Jun. 26, 2025, 6 pages.

Malavolta G., et al., "Anonymous Multi-Hop Locks for Blockchain Scalability and Interoperability," Proceedings 2019 Network and Distributed System Security Symposium. Internet Society, 2019.

Poon J., etal, "The Bitcoin Lightning Network: Scalable Off-Chain Instant Payments," Jan. 14, 2016, Retrieved from Internet: https://lightning.network/lightning-network-paper.pdf, 59 pages.

\* cited by examiner

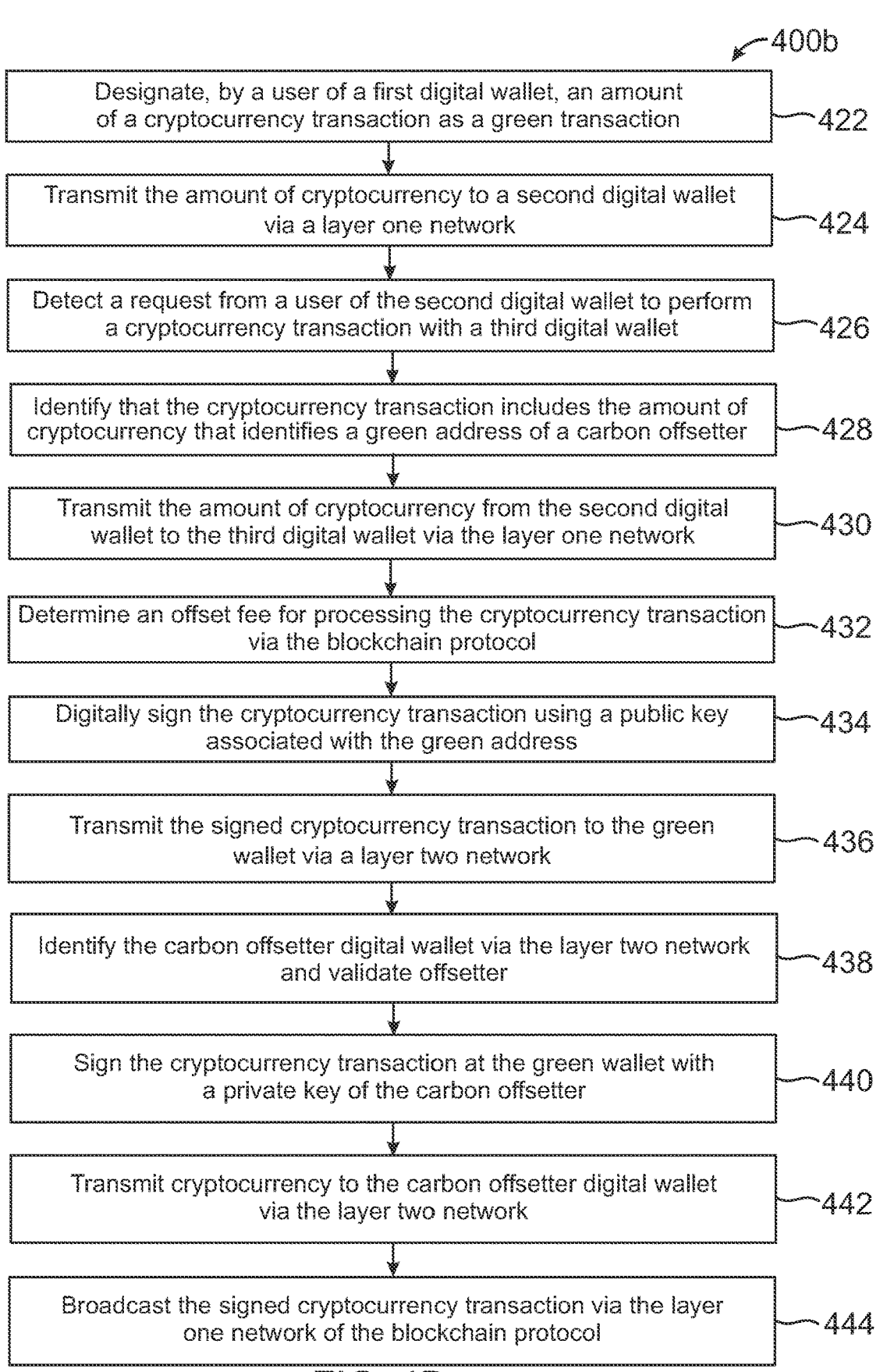

400b

| | |
|---|---|
| Designate, by a user of a first digital wallet, an amount of a cryptocurrency transaction as a green transaction | 422 |
| Transmit the amount of cryptocurrency to a second digital wallet via a layer one network | 424 |
| Detect a request from a user of the second digital wallet to perform a cryptocurrency transaction with a third digital wallet | 426 |
| Identify that the cryptocurrency transaction includes the amount of cryptocurrency that identifies a green address of a carbon offsetter | 428 |
| Transmit the amount of cryptocurrency from the second digital wallet to the third digital wallet via the layer one network | 430 |
| Determine an offset fee for processing the cryptocurrency transaction via the blockchain protocol | 432 |
| Digitally sign the cryptocurrency transaction using a public key associated with the green address | 434 |
| Transmit the signed cryptocurrency transaction to the green wallet via a layer two network | 436 |
| Identify the carbon offsetter digital wallet via the layer two network and validate offsetter | 438 |
| Sign the cryptocurrency transaction at the green wallet with a private key of the carbon offsetter | 440 |
| Transmit cryptocurrency to the carbon offsetter digital wallet via the layer two network | 442 |
| Broadcast the signed cryptocurrency transaction via the layer one network of the blockchain protocol | 444 |

FIG. 4B

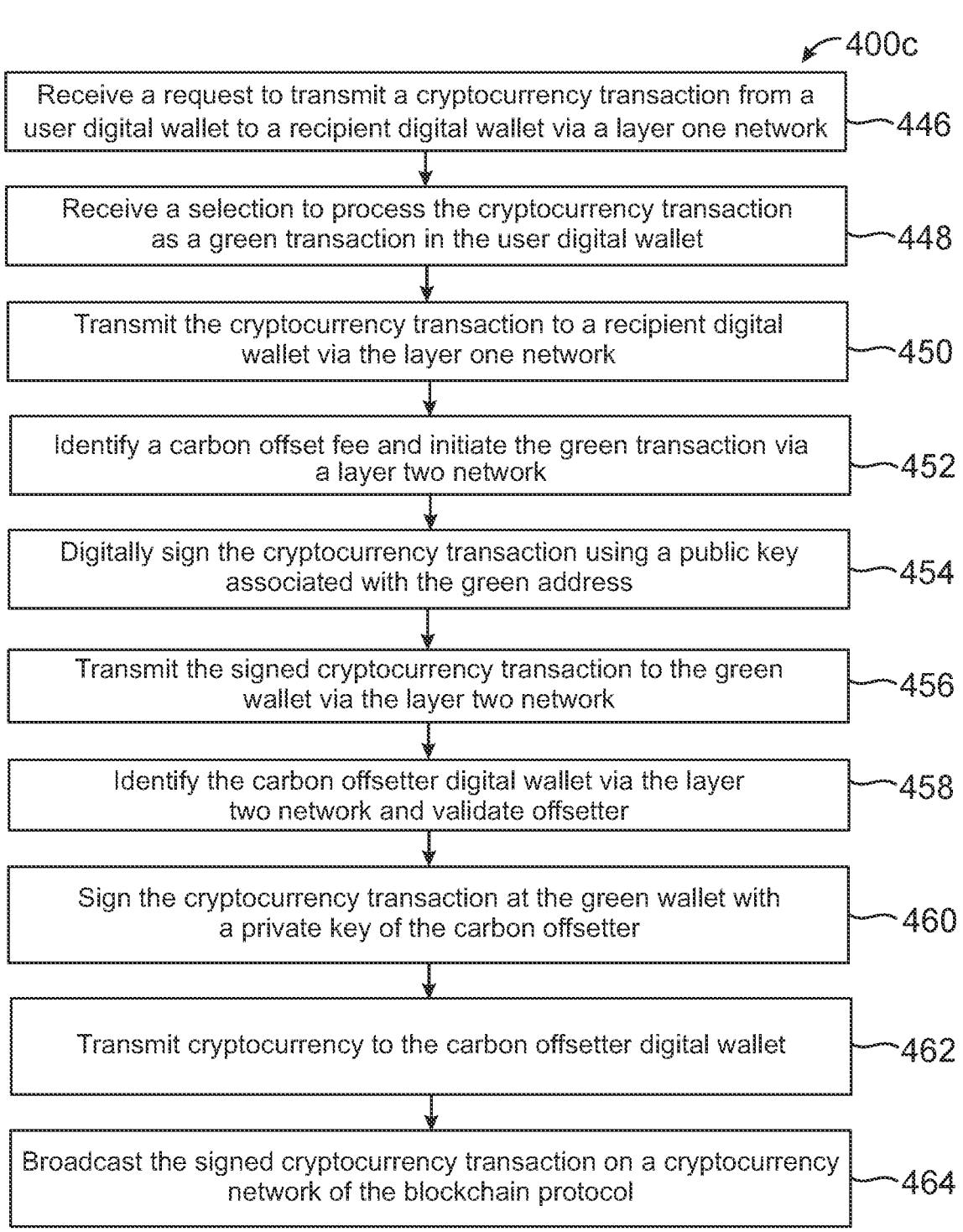

400c

Receive a request to transmit a cryptocurrency transaction from a user digital wallet to a recipient digital wallet via a layer one network —446

Receive a selection to process the cryptocurrency transaction as a green transaction in the user digital wallet —448

Transmit the cryptocurrency transaction to a recipient digital wallet via the layer one network —450

Identify a carbon offset fee and initiate the green transaction via a layer two network —452

Digitally sign the cryptocurrency transaction using a public key associated with the green address —454

Transmit the signed cryptocurrency transaction to the green wallet via the layer two network —456

Identify the carbon offsetter digital wallet via the layer two network and validate offsetter —458

Sign the cryptocurrency transaction at the green wallet with a private key of the carbon offsetter —460

Transmit cryptocurrency to the carbon offsetter digital wallet —462

Broadcast the signed cryptocurrency transaction on a cryptocurrency network of the blockchain protocol —464

FIG. 4C

CARBON NEUTRAL BLOCKCHAIN PROTOCOL FOR RESOLVING CARBON OFFSETTER PAYMENTS FOR CRYPTOCURRENCY TRANSACTIONS

CROSS REFERENCE RELATED APPLICATIONS

The present application is a continuation of U.S. patent application Ser. No. 17/403,755, filed Aug. 16, 2021, which is incorporated by reference in it's entirety.

TECHNICAL FIELD

The present application generally relates to blockchain protocols and cryptocurrency processing networks, and more particularly to providing carbon offsetter payments on a layer two network to offset cryptocurrency payments made via a layer one network.

BACKGROUND

Users may utilize cryptocurrency networks to process cryptocurrency payments between different users, which may require resolution by updating a distributed ledger over a blockchain protocol network. For example, when Bitcoins are transferred between users, such as when paying a transaction, transactions may be added for processing by miners and addition to blocks on a blockchain. Each block may refer to a ledger record or block that is designed to record the transaction on the distributed ledger for proof of the transactions. Miners may be used to verify and record the individual blocks on the blockchain, which requires computing power to broadcast and verify the transactions on recipient nodes after computing some value, such as a nonce. Thus, each block requires a proof of work, which is used to verify and accept each block on the blockchain network. When computing the proof of work, miners may utilize computing devices to calculate and process the required value to verify a block. However, this requires computing power, which further requires resources that lead to carbon emissions. For example, the electricity used during mining may make a substantial carbon footprint by requiring significant electricity and other resources to power the computing devices performing the calculations. Thus, requesting cryptocurrency transaction processing on a blockchain network is not carbon neutral and instead may lead to significant pollution and/or carbon waste. Thus, it is desirable to offset this waste when processing cryptocurrency transactions.

BRIEF DESCRIPTION OF THE DRAWINGS

FIG. 4B is a flowchart for a carbon neutral blockchain protocol for resolving carbon offsetter payments for cryptocurrency transactions that use cryptocurrency previously designated for a green transaction, according to an embodiment;

FIG. 4C is a flowchart for a carbon neutral blockchain protocol for resolving carbon offsetter payments for cryptocurrency transactions designated for a green transaction during transaction processing, according to an embodiment.

Figure 1:
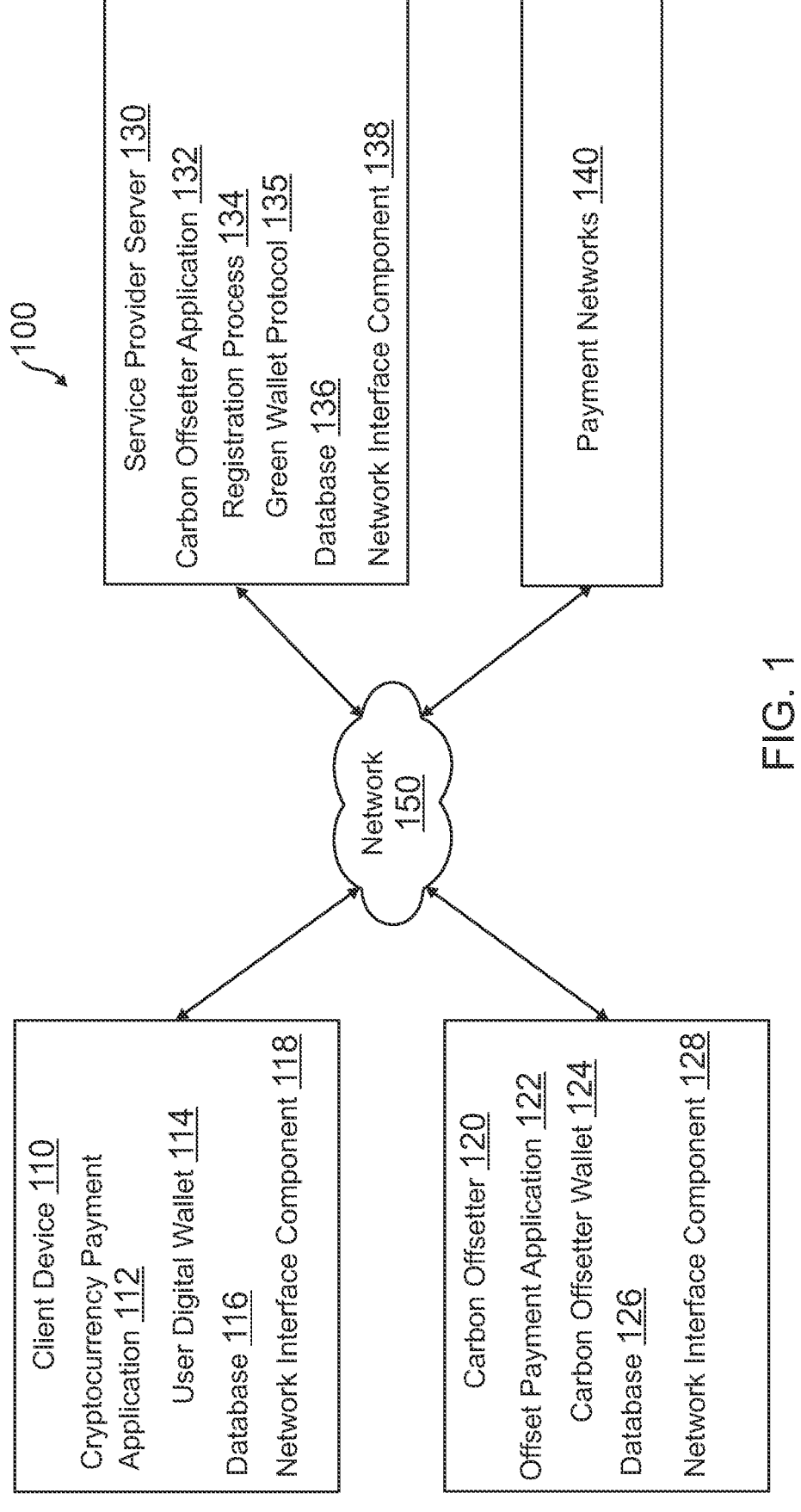
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a carbon neutral blockchain protocol for resolving carbon offsetter payments for cryptocurrency transactions. Systems suitable for practicing methods of the present disclosure are also provided.

A user may utilize cryptocurrency and a digital cryptocurrency wallet to process payments through a blockchain protocol and network associated with the cryptocurrency. For example, a user may make a cryptocurrency payment to another user or otherwise transfer cryptocurrency between digital wallets, nodes, or users, which transfers ownership of the cryptocurrency. When persisting the transaction to a digital ledger associated with the blockchain protocol, miners may be used to verify the transaction, broadcast on the network, and cause the transaction to be recorded in a block on the corresponding blockchain. This requires data processing by computing devices, which can result in large consumption of electricity and other resources. Usage of these resources is therefore not carbon neutral, and a large number of transactions may cause a significant carbon footprint.

As such, in one embodiment, a carbon neutral blockchain protocol and network provides a green wallet, which may process payments to a valid carbon offsetter to offset this amount of carbon consumption. The green wallet may reside on a different network on top of the blockchain network for the cryptocurrency. For example, the green wallet may reside on a layer two network, such as a Lighting network, that resides on top of a layer one network used to process and record cryptocurrency transactions between users. This green wallet may be used to receive a cryptocurrency transaction with another cryptocurrency transaction for a transaction offset fee that provides a fee to the carbon offsetter that offsets the carbon usage for processing the cryptocurrency transaction. Thereafter, the green wallet may make a payment to a digital wallet of the carbon offsetter for the offset fee.

For example, a user may wish to process a cryptocurrency transaction, such as for a payment to another user or a transfer of cryptocurrency. A user may pay for one or more cryptocurrency transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with cryptocurrency or cryptocurrency may otherwise be added to the account or digital wallet, such as by storing private keys for the cryptocurrency or other cryptocurrency coins and/or coin validation data to the account or digital wallet. The application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more cryptocurrency transactions with a recipient, such as a recipient digital wallet that may receive an amount of cryptocurrency. When generating a transaction, a user may designate the recipient and an amount of cryptocurrency to transfer to the recipient. When designating the cryptocurrency, all or a portion of the cryptocurrency may be designated as "green" cryptocurrency or for a green cryptocurrency transaction. This may therefore designate that an offset fee is required to be made to a carbon offsetter when the cryptocurrency is processed in a transaction and exchanged with another user. A process is then engaged to perform a payment to the carbon offsetter for another amount of cryptocurrency that offsets transaction processing on the blockchain network for the amount of cryptocurrency originally designated in the cryptocurrency transaction.

In this regard, a carbon offsetter may initially be required to register with the green wallet for carbon offset payments and fees made to offset a carbon usage or footprint of underlying cryptocurrency transactions, such as Bitcoin transactions on a layer one network used to record and persist cryptocurrency transactions on a blockchain ledger for the cryptocurrency. The carbon offsetter may sign up by initially requesting registration and/or signup with the green wallet. This may include providing an identity or other identification information for the carbon offsetter, which may be used to verify and validate an identity of the carbon offsetter as a valid carbon offsetter, such as one that performs carbon offsetting (e.g., by planting trees, engaging in renewable energy projects, destroying pollutants, and other projects designed to reduce carbon emissions or otherwise offset carbon usage). Validation may be done through looking up the carbon offsetter and confirming that the carbon offsetter is engaged in projects to reduce carbon emissions, such as by verifying with an authority or other validating agency, deny/allow list, or the like.

Once verified, a green wallet protocol for the green wallet on the green wallet network may be used to generate encryption keys, such as a public and private encryption key pair that may be used to sign digital cryptocurrency transactions. The public key may then be designated as a green address for the carbon offsetter and may be shared over the green network using a public list of green addresses. During the registration, a digital wallet of the carbon offsetter may be generated, which may correspond to a digital wallet to receive cryptocurrency payments on the green wallet network, such as a Lightning network digital wallet or other wallet on a layer two network. The wallet may be used to receive carbon offset payments and fees for an amount of cryptocurrency used to offset processing cryptocurrency payments. The key pair may then be stored by servers and/or databases of the green wallet, which may then be used for private key signing of cryptocurrency transactions involving the carbon offsetter by the green wallet.

Thereafter, when a public key is accessed for the carbon offsetter or another carbon offsetter, the public key may be associated with a cryptocurrency transaction and be used to designate the cryptocurrency transaction as a green transaction. When a cryptocurrency transaction is initiated, a user's digital wallet may be used to determine if one or more unspent transaction outputs (UTXOs) for cryptocurrency in the transaction is designated for transaction offset fees and green cryptocurrency transactions. In other embodiments, the user may initiate, through the user's digital wallet, that the transaction is a green wallet transaction based on user input. For example, the user may select an option in the digital wallet to execute the transaction as a green transaction. This may then allow the transaction to go through a layer one network (e.g., the cryptocurrency's layer one network for blockchain recordation), where a carbon offset fee is then initiated and resolved on a layer two network from a fee paid by the user and transmitted to a carbon offsetter's digital wallet on the layer two network. This may utilize a green wallet protocol for a green wallet to identify keys for green addresses, sign transactions, and transmit offset fees via the layer two network. Thus, a user's digital wallet may be required to be compatible with the green wallet protocol, for example, by detecting green addresses associated with carbon offsetters, interacting with the green wallet, sending payments over the layer two network, and calculating carbon adjusted transaction and offset fees for cryptocurrency transactions.

If one or more of the UTXOs referred in the input of the layer one cryptocurrency transaction includes a green address, as well as a two-of-two multi-signature locking script, then the digital wallet of the user may identify the previous owner of the UTXO(s) as designating the corresponding cryptocurrency for a green transaction via a layer two network, thereby requiring a carbon offset fee to be paid on the layer two network. Thus, a token or amount may be locked in the green wallet protocol for green transactions via the layer two network by a previous user and the token or amount may have a preexisting green address associated with that token or amount. The user's digital wallet may recognize the green address based on compatibility with the green wallet protocol. In further embodiments, the user may designate the cryptocurrency transaction via the layer two network as a green transaction and may enter or select a green address to pay the cryptocurrency transaction's carbon offset fee (e.g., from a public list of green addresses that may be compatible and accessible via the user's digital wallet). This allows a user to designate a cryptocurrency transaction via the layer one network as a green transaction without the token or amount as input to the transaction being locked as a green transaction. However, the user may specify an amount of the cryptocurrency transaction on the layer one network, and therefore the amount to be paid for the carbon offset fee may be calculated and/or determined from the underlying cryptocurrency transaction.

This may initiate the green wallet protocol. The user's digital wallet may further inquire if the user, as the sender in the transaction, further wishes to sign the underlying cryptocurrency transaction that is processed via the layer one network as a green transaction. If this is selected, then the user may be given an option to further select a carbon offsetter for the carbon offset cryptocurrency transaction via the layer two network, which may be done through the public list of green addresses, by randomization, or by selection in an ordered sequence, such as in a round robin manner. This then causes a further use, such as one or more next uses of the cryptocurrency, to further require a carbon offset fee to be processed. If signed, then a two-of-two multi-signature locking script is further generated and added to the UTXO for the cryptocurrency transaction being processed via the layer one network.

The user's digital wallet may then transfer the partially signed carbon offset cryptocurrency transaction to the green wallet for the green wallet protocol. Further, the user's digital wallet may calculate fees required for the carbon offset payment via the layer two network, such as an amount of fees required to offset carbon usage by processing the cryptocurrency transaction on the layer one network. These fees may be calculated for the particular carbon offsetter and/or parameters of the cryptocurrency transaction via the layer one network, and once calculated, an amount of cryptocurrency for these fees is further transferred, over the layer two network for the green wallet protocol, to the green wallet. In some embodiments, although a layer one network may serve as the network for processing the cryptocurrency transaction, a cryptocurrency transaction that is offset may further or instead be processed on a layer two network.

The green wallet may then receive the carbon offset cryptocurrency transaction corresponding to the identified fees via the layer two network. The green wallet may receive the carbon adjusted or offset fees for the cryptocurrency transaction and map those fees (e.g., having the amount of cryptocurrency for the fees) to the user's digital wallet and the carbon offsetter. The green wallet may validate the carbon adjusted fees in the transaction, as well as the green address (e.g., public key) for the carbon offsetter's digital wallet. Validating may be done through public key lookup with an address for the corresponding digital wallet that is associated with the public key. Using the public key for the carbon offsetter, the green wallet may then fetch the private key for the carbon offsetter's digital wallet. This may be stored by the servers of the green wallet in a secure manner so that only the green wallet may sign cryptocurrency transactions using the private key. The private key may then be used to further digitally sign the cryptocurrency transaction, which may then complete signing of the cryptocurrency transaction.

Once completely signed, the green wallet may then broadcast the digitally signed carbon offset cryptocurrency transaction over the layer one network for the blockchain protocol used by the cryptocurrency. Broadcasting may further cause the cryptocurrency transaction on the layer one network to be finalized and recorded. This allows the carbon offset cryptocurrency transaction on the layer two network to be processed between the user's digital wallet and the carbon offsetter's digital wallet, which concludes cryptocurrency transaction processing for the designated cryptocurrency and UTXO(s).

In order to finalize offsetting of the carbon usage of the cryptocurrency transaction, the green wallet may be required to finalize the payment of the carbon offset fee to the carbon offsetter on the layer two network. Thus, the green wallet may utilize the public key to identify the digital wallet of the carbon offsetter. This may also be done by looking up the carbon offsetter via the public list of green addresses, which may correspond to a list or ledger of public keys associated with green addresses for carbon offsetters' digital wallets. The green wallet may then transfer or transmit the amount of cryptocurrency for the carbon offset fee to the digital wallet of the carbon offsetter. This may occur through the layer two network instead of the layer one network, which would cause a rise in a number of on-chain transactions and therefore more carbon emissions. Thus, the carbon costs of the carbon offset transaction are not caused by the layer one network, which allows the carbon to be offset for processing the original cryptocurrency transaction on the layer one network between the user and the recipient.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110, a carbon offsetter 120, a service provider server 130, and payment networks 140 in communication over a network 150. Client device 110 may be used to process payments, such as through a payments platform, application, and/or application extension, which may be facilitated through digital accounts and wallets that allow for cryptocurrency transaction processing through payment networks 140. During cryptocurrency transaction processing, a transaction offset fee for a carbon usage associated with cryptocurrency transaction processing may be determined and provided to carbon offsetter 120 by service provider server 130 using a green wallet, where processing of cryptocurrency may occur over payment networks 140.

Client device 110, carbon offsetter 120, service provider server 130, and payment networks 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented using any appropriate hardware and software configured for wired and/or wireless communication with carbon offsetter 120, service provider server 130, and/or payment networks 140 for processing payments and transactions. Client device 110 may correspond to an individual user, consumer, or merchant that utilizes a peer-to-peer payment network and platform provided by service provider server 130 to process those payments. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing devices may function similarly.

Client device 110 of FIG. 1 contains a cryptocurrency payment application 112, a database 116, and a network interface component 118. Cryptocurrency payment application 112 may correspond to executable processes, procedures, and/or applications with associated hardware. In other embodiments, client device 110 may include additional or different software as required.

Cryptocurrency payment application 112 may correspond to one or more processes to execute modules and associated devices of client device 110 to provide a convenient interface to permit a user for client device 110 to enter, view, and/or process cryptocurrency transactions, such as using a user digital wallet 114 having cryptocurrency and/or cryptocurrency keys. In this regard, cryptocurrency payment application 112 may correspond to specialized hardware and/or software utilized by client device 110 that may provide transaction processing for cryptocurrency, such as through a user interface enabling the user to enter and/or view the cryptocurrency for processing in a transaction. This may be based on a transaction generated by cryptocurrency payment application 112 using a merchant website provided by carbon offsetter 120. Cryptocurrency payment application 112 may also be used by a user to provide payments and transfers of cryptocurrency with carbon offsetter 120 for carbon offset payments. For example, cryptocurrency payment application 112 may utilize an amount of cryptocurrency to provide payments to recipients and carbon offsetters. Additionally, cryptocurrency payment application 112 may utilize user digital wallet 114 associated with cryptocurrency and cryptocurrency processing. Cryptocurrency payment application 112 may also be used to receive a receipt or other information based on transaction processing.

User digital wallet 114 may be integrated with a green wallet protocol 135 of service provider server 130 for resolving carbon offset payments. In this regard, payments may be resolved for cryptocurrency using payment networks 140. In various embodiments, cryptocurrency payment application 112 may correspond to a general browser application configured to retrieve, present, and communicate information over the Internet (e.g., utilize resources on the World Wide Web) or a private network. For example, cryptocurrency payment application 112 may provide a web browser, which may send and receive information over network 150, including retrieving website information, presenting the website information to the user, and/or communicating information to the website, including payment information for the transaction. However, in other embodiments, cryptocurrency payment application 112 may include a dedicated application of service provider server 130 or other entity (e.g., a merchant), which may be configured to assist in processing cryptocurrency transactions, such as a mobile application on a mobile device.

Client device 110 may further include database 116 which may include, for example, identifiers such as operating system registry entries, cookies associated with cryptocurrency payment application 112 and/or other applications, identifiers associated with hardware of client device 110, or other appropriate identifiers. Identifiers in database 116 may be used by a payment/service provider to associate client device 110 with a particular account maintained by the payment/service provider. Database 116 may also further store received cryptocurrency transaction data and/or data for use of cryptocurrency, including private keys or the like that may be used to verify ownership of cryptocurrency using user digital wallet 114.

Client device 110 includes at least one network interface component 118 adapted to communicate with carbon off-setter 120, service provider server 130, and/or payment networks 140 over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Carbon offsetter 120 may be implemented as a communication device that may utilize appropriate hardware and software configured for wired and/or wireless communication with client device 110, service provider server 130, and/or payment networks 140 to provide for carbon offset fee payments made to an entity performing carbon offsetting. Carbon offsetter 120 may correspond to a personal computing device for a merchant, for example, a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In other embodiments, carbon offsetter 120 may correspond to a server, such as a stand-alone or enterprise-class servers, operating an OS such as a MICROSOFT® OS, a UNIX® OS, a LINUX® OS, or another suitable server-based OS. In one example, carbon offsetter 120 may correspond to a device of a carbon offsetter that utilizes PAY-PAL®, Inc. of San Jose, CA, USA for transaction processing. However, in other embodiments, carbon offsetter 120 may be maintained by another type of entity. Although only one device is shown, a plurality of devices and/or servers may function similarly and/or be connected to provide the functionalities described herein.

Carbon offsetter 120 of FIG. 1 contains an offset payment application 122, a database 126, and a network interface component 128. Offset payment application 122 may correspond to executable processes, procedures, and/or applications with associated hardware. In other embodiments, carbon offsetter 120 may include additional or different modules having specialized hardware and/or software as required.

Offset payment application 122 may correspond to one or more processes to execute software using associated hardware components of carbon offsetter 120 to provide features, services, and other operations to a carbon offsetter entity, such as one that provides carbon offsetting processes to reduce or reverse carbon emissions. In this regard, offset payment application 122 may be utilized by a user of carbon offsetter 120 to provide a website and/or online portal for carbon offsetting. This may allow for payments to be made to the entity that is providing carbon offsetting, which may then be used to invest or provide the carbon emission reduction or reversal processes. Further, offset payment application 122 provides and/or accesses carbon offsetter wallet 124, which may be provided to the carbon offsetter in response to a registration process 134 being completed by the carbon offsetter. Thereafter, using a green wallet protocol 135, transaction offset and/or adjustment fees may be provided to the entity performing the carbon offsetting using carbon offsetter wallet 124. Carbon offsetter wallet 124 may therefore correspond to a cryptocurrency wallet that may receive cryptocurrency payments for these fees during cryptocurrency transaction processing. In some embodiments, carbon offsetter wallet 124 may correspond to a digital wallet on a layer two network, such as a Lightning wallet on a Lightning network.

Carbon offsetter 120 may further include database 126 stored on a transitory and/or non-transitory memory of carbon offsetter 120, which may store various applications and data and be utilized during execution of various modules of carbon offsetter 120. Database 126 may include, for example, identifiers such as operating system registry entries, cookies associated with offset payment application 122, identifiers associated with hardware of carbon offsetter 120, or other appropriate identifiers, such as identifiers used for payment/user/device authentication or identification, which may be communicated as identifying the user/carbon offsetter 120 to service provider server 130. Moreover, database 126 may data associated with carbon offsetter wallet 124, such as encryption keys associated with cryptocurrency, proof of cryptocurrency ownership and/or possession, and the like. Information necessary for determining carbon offset payments may also be stored in database 126, such as information necessary to calculate an offset fee.

Carbon offsetter 120 includes at least one network interface component 128 adapted to communicate with client device 110, service provider server 130, and/or payment networks 140. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide operations for a green wallet on a layer two network to resolve carbon offsetting payments to carbon offsetter 120 for transactions processed on a layer one network for a blockchain protocol for cryptocurrency. In such embodiments, service provider server 130 may interface with the layer one and layer two networks via payment networks 140. Service provider server 130 includes one or more processing applications which may be configured to interact with client device 110 and carbon offsetter 120 for resolving cryptocurrency transactions and payments on payment networks 140. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes a carbon offsetter application 132, a database 134, and a network interface component 138. Carbon offsetter application 132 may correspond to executable processes, procedures, and/or applications with associated hardware. In other embodiments, service provider server 130 may include additional or different modules having specialized hardware and/or software as required.

Carbon offsetter application 132 may correspond to one or more processes to execute software using associated hardware components of service provider server 130 to process a cryptocurrency transaction for a carbon offsetting fee provided to carbon offsetter 120 by a green wallet. In some embodiments, carbon offsetter application 132 may be used by a user associated with carbon offsetter 120 to establish a payment account and/or digital wallet, which may be used to process cryptocurrency transactions. In various embodiments, cryptocurrency may be stored to the account. A digital token for the wallet may be used to send and process payments, for example, through an interface provided by service provider server 130. The digital wallet may be accessed and/or used through a browser application/extension and/or dedicated payment application executed by client device 110 and/or carbon offsetter 120 and engage in cryptocurrency transaction processing, such as using user digital wallet 114 and/or carbon offsetter wallet 124. In various embodiments, carbon offsetter application 132 may be used to generate a transaction for a carbon offset fee to be provided to carbon offsetter 120 for processing a transaction with a cryptocurrency network.

Carbon offsetter application 132 may therefore include registration process 134, which may be used by carbon offsetters in order to register as a valid carbon offsetter in order to receive payments for carbon offset fees from processing cryptocurrency transactions. In this regard, registration process 134 may include a process for a carbon offsetter, such as carbon offsetter 120, to provide credentials, identification, and/or validation that the carbon offsetter is a valid carbon offsetter to receive payments for carbon offset fees. A validation process may then be implemented by registration process 134 to validate the carbon offsetter. If validated, the carbon offsetter may then have a digital wallet, such as carbon offsetter wallet 124, on a cryptocurrency payment network. The network may be a layer two network, such as a Lightning network, and may be used to receive cryptocurrency payments for carbon offset fees. Further, encryption keys, such as a public-private encryption key pair, may be generated for the carbon offsetter. The public key may be registered as a green address for the carbon offsetter and associated with the digital wallet so that when the public key is received, the carbon offsetter and digital wallet on the layer two network may be determined and used for carbon payments. The private key and/or key pair may then be stored by service provider server 130 and/or other servers for a green wallet, which may later be used for cryptocurrency transaction signing.

Further, carbon offsetter application 132 includes green wallet protocol 135, which may correspond to the protocol to provide a green wallet on a layer two network that is used for carbon offset payments and cryptocurrency transaction processing after signing and broadcasting a cryptocurrency transaction. When a cryptocurrency transaction is requested to be processed by user digital wallet 114, user digital wallet may check to see if one or more UTXOs in the transaction include a green address and/or are designated for green transaction processing that requires an offset payment to be made to carbon offsetter 120 for processing the cryptocurrency transaction. This may be done based on having the green address with the UTXO(s) and a two-for-two multi-signature locking script that requires two signatures for processing, one by user digital wallet 114 and another by the green wallet provided by green wallet protocol 135. The green address may be used to look up carbon offsetter 120 and confirm carbon offsetter wallet 124. Further, the green address may correspond to a public key used by user digital wallet 114 to sign the cryptocurrency transaction.

Thereafter, green wallet protocol 135 may designate that the green wallet receives the cryptocurrency transaction. The green wallet may further receive a transaction or carbon adjustment or offset fee payment from user digital wallet 124, which may include an amount of cryptocurrency for processing via a layer two network for the underlying cryptocurrency. The green wallet may verify carbon offsetter 120 using a public list of green addresses and carbon offsetters. If valid, the green wallet then digitally signs the cryptocurrency transaction using the private key of the carbon offsetter. The twice signed cryptocurrency transaction requiring the two-of-two multi-signature locking script requirement may be broadcast on the blockchain network for the cryptocurrency (e.g., the layer one network). In order to offset processing of the cryptocurrency transaction on the layer one network, the carbon offset fee provided by client device 110 as additional cryptocurrency for the layer two network may then be provided to carbon offsetter wallet 124 over the layer two network.

Additionally, service provider server 130 includes database 136. Database 136 may store various identifiers associated with client device 110. Database 134 may also store account data, including payment instruments and authentication credentials, as well as transaction processing histories and data for processed transactions. Database 136 may further be used to store a public list of green addresses, as well as encryption keys (e.g., public/private asymmetric key pairs for carbon offsetters and their corresponding digital wallets). This may be updated and maintained using a green wallet protocol for providing carbon offsetting payments.

In various embodiments, service provider server 130 includes at least one network interface component 138 adapted to communicate client device 110, carbon offsetter 120, payment networks 140, and/or another device/server for a merchant over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment networks 140 may correspond to cryptocurrency payment networks, which may be used to process cryptocurrency payments. For example, payment networks 140 may correspond to networks of devices that may communicate to share, update, and maintain a distributed ledger for cryptocurrency transaction processing and maintain block records on a blockchain for the cryptocurrency that is being processed in transactions. In this regard, payment networks 140 may include cryptocurrency transaction participants and miners, where cryptocurrency transaction participants may process transactions to exchange and/or pay cryptocurrency between different users and participants. When a transaction is generated, a record may be required to be generated, updated, and maintained on the blockchain, which requires a level one network for the cryptocurrency and allows miners to validate and broadcast the transactions and records over the distributed ledger for the blockchain. The level one network may correspond to a base network where cryptocurrency transactions are persisted in block records on the blockchain when processed, such as a Bitcoin network and protocol. However, this may be carbon intensive, especially for numerous transactions. As such, carbon offsetting may be provided for usage of the layer one network for cryptocurrency processing.

Further, payment networks 140 may include a layer two network, such as a Lightning network, that may reside on top of processing for the layer one network for the cryptocurrency and allow for additional cryptocurrency processing. In this regard, the layer two network may not persist cryptocurrency transactions when each is conducted in a ledger and may batch processing so that cryptocurrency processing uses less carbon emissions (e.g., from computing processing power or electricity). This may not require miner verification for microtransactions and the like, which would otherwise unnecessarily waste carbon. This allows for cryptocurrency transactions to be processed for transaction and carbon offset fees to a valid carbon offsetter, such as carbon offsetter 120. Payment networks 140 may be integrated with user digital wallet 114, carbon offsetter wallet 124, and carbon offsetter application 132 for a green wallet maintained by green wallet protocol 135 in order to provide the carbon offsetting. In this regard, payment networks 140 may be used to resolve cryptocurrency transactions, such as by processing cryptocurrency transactions between different digital wallets.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
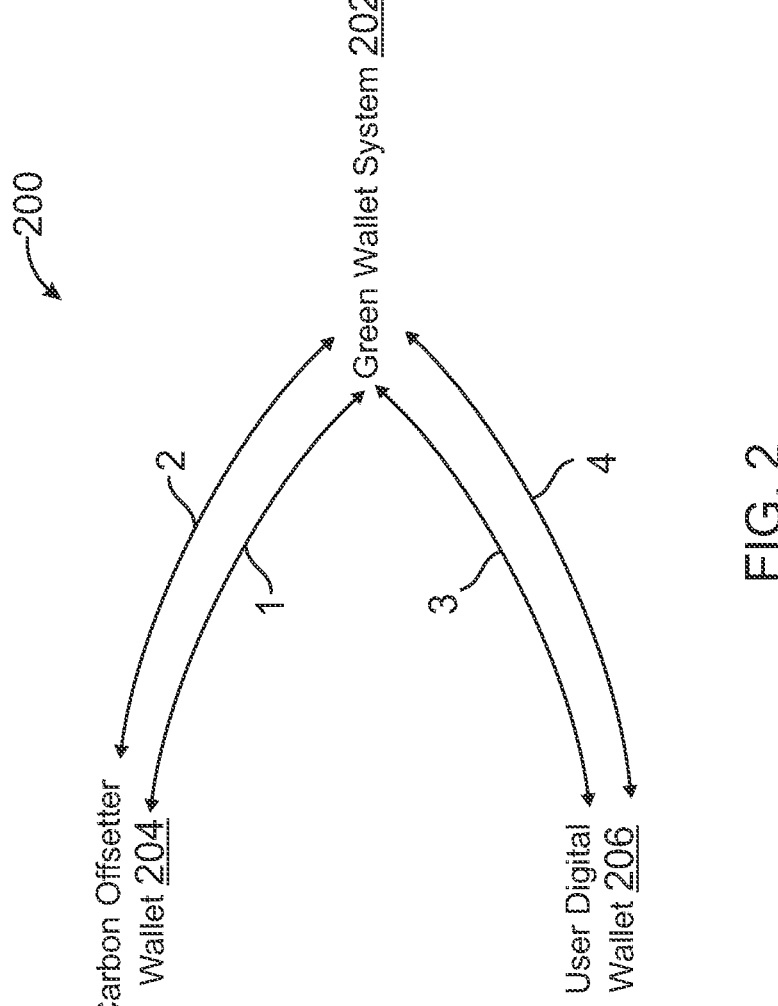
FIG. 2 is exemplary system environment having interactions between different systems and nodes on a blockchain network for offsetting carbon output from cryptocurrency transaction processing, according to an embodiment.

FIG. 2 is an exemplary system environment 200 having interactions between different systems and nodes on a blockchain network for offsetting carbon output from cryptocurrency transaction processing, according to an embodiment. System environment 200 includes a green wallet system provided by a service provider, such as service provider server 130 discussed in reference to system 100 of FIG. 1. System environment 200 may correspond to a system having interactions for registering a carbon offsetter wallet 204 and a user digital wallet 206 for cryptocurrency transaction processing with green transactions.

In system environment 200, initially, a carbon offsetter may request that carbon offsetter wallet 204 is generated and/or registered with green wallet system 202 in order to receive payments for carbon offsetting fees for cryptocurrency transaction processing using a blockchain protocol on a layer one network. In this regard, the carbon offsetter may begin by requesting registration and/or validation as a valid carbon offsetter with green wallet system 202, which initiates this process. This may be done by providing some information about the carbon offsetter (e.g., incorporation documents, EIN or other taxation status, information from an authority that indicates the carbon offsetter is valid, and the like), at interaction 1. Further, carbon offsetter wallet 204 may be provided during registration and/or carbon offsetter wallet 204 may be requested to be established and created for the carbon offsetter.

At interaction 1, green wallet system 202 may respond to the registration request by validating the carbon offsetter and generating a pair of encryption keys, such as a public key and a private key. Green wallet system 202 further initiates the process to either register carbon offsetter wallet 204 or create carbon offsetter wallet 204 on a layer two network, such as a Lightning network that exists on top of a layer one network that records cryptocurrency transactions (e.g., a Bitcoin network for Bitcoin protocol cryptocurrency transactions). The layer one network may require proof of work for return of cryptocurrency during mining, but other proof of stake cryptocurrencies and their corresponding network protocols may also be used. In this regard, carbon offsetter wallet 204 resides on a network that requires less carbon emissions for cryptocurrency transaction processing, recordation, and/or validation.

At interaction 2, green wallet system 202 then responds to carbon offsetter wallet 204 by providing carbon offsetter wallet 204 and/or verifying registration of carbon offsetter wallet 204. This may further include providing the public key as the green address to carbon offsetter wallet 204 so that the green address may be distributed to others for carbon offsetting. At interaction 2, green wallet system 202 may then enable the encryption key pair (e.g., the asymmetric public private encryption key pair) for use with user digital wallet 206 and/or other digital wallets in order to perform carbon offset payments. A public list of green addresses may then be updated with the public key of the carbon offsetter, which allows for carbon offsetting payments to be made to carbon offsetter wallet 204.

At interaction 3, user digital wallet 206 is registered and made compatible with green wallet system 202. This may be done by registering user digital wallet 206 and/or generating a new digital wallet for user digital wallet 206 that may be used on the layer two network for the cryptocurrency. Additionally, at interaction 3, add-ons may be provided to existing wallets, such as existing Bitcoin wallets without changing the existing wallet functionalities for user digital wallet 206. In this regard, at interaction 3, user digital wallet may be provided with the functionality to detect green addresses when attached or used to provide a two-of-two locking multi-signature locking script that denotes UTXOs or other cryptocurrency as locked for green transactions and therefore requiring a carbon offset payment to be made to carbon offsetter wallet 204 when used. This includes processes to detect registered green addresses with the green wallet protocol for green wallet system 202.

Further, the compatibilities for user digital wallet 206 may allow user digital wallet 206 to interact with green wallet system 202, such as by signing cryptocurrency transactions with public keys for green addresses, setting cryptocurrencies for use with green transactions, and/or providing carbon offset fees. In this regard, the compatibilities may allow for user digital wallet 206 to send payments using cryptocurrency over the layer two network when processing a cryptocurrency transaction on the layer one network. In order to send these payments, user digital wallet 206 may be updated with processes and operations to calculate carbon adjusted transaction fees for cryptocurrency transactions based on an amount of cryptocurrency to provide on the layer 2 network. Thereafter, at interaction 4, the public list of green addresses is provided to user digital wallet 206 by green wallet system 202. This allows for user digital wallet 206 to lookup green addresses when detected in or associated with a cryptocurrency transaction (e.g., linked to a UTXO as a transaction input).

Figure 3:
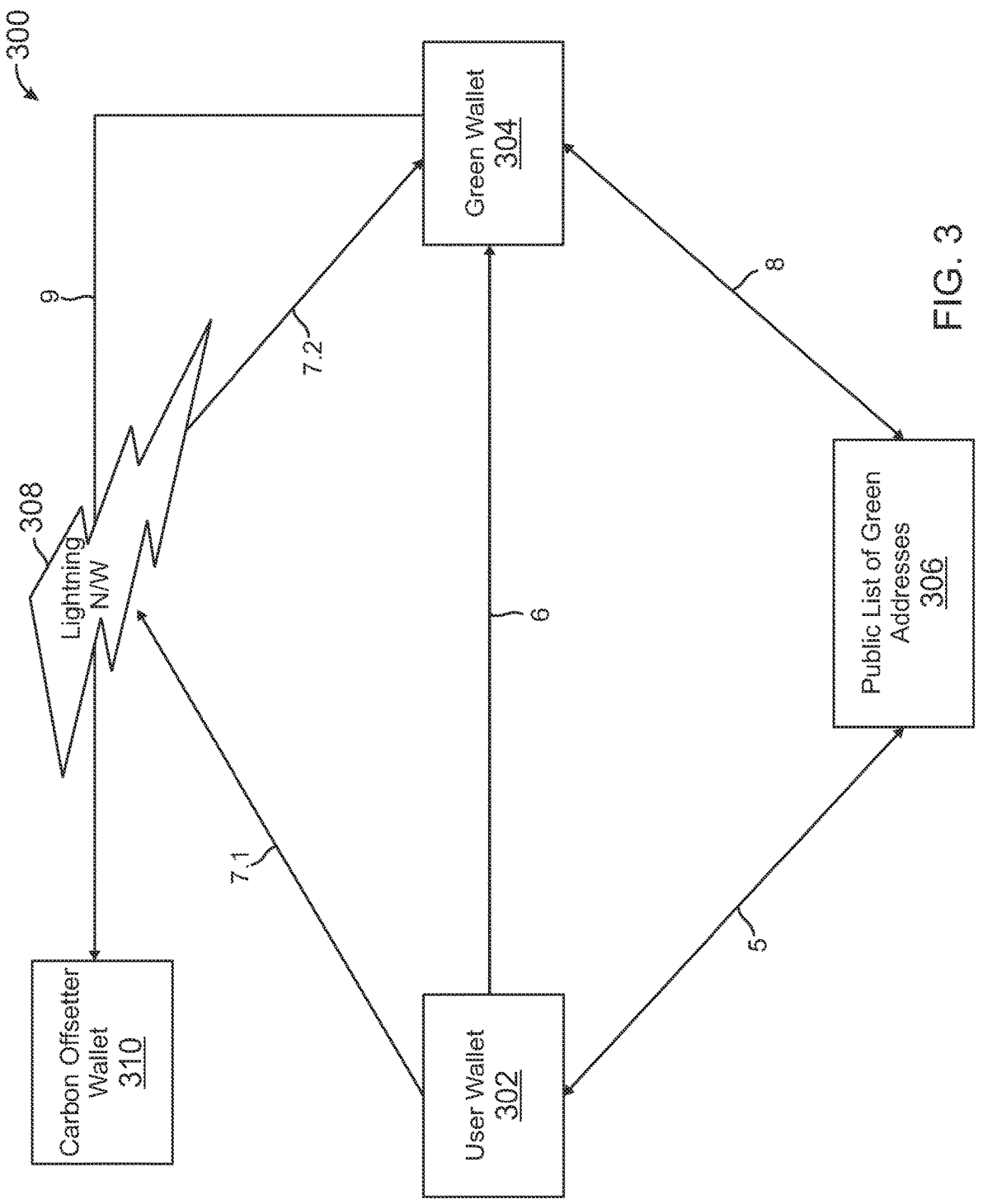
FIG. 3 is exemplary blockchain network for a carbon neutral blockchain protocol for resolving carbon offsetter payments for cryptocurrency transactions, according to an embodiment.

FIG. 3 is exemplary blockchain network 300 for a carbon neutral blockchain protocol for resolving carbon offsetter payments for cryptocurrency transactions, according to an embodiment. Network 300 includes a green wallet 304 provided by a service provider, such as service provider server 130 discussed in reference to system 100 of FIG. 1. In this regard, network 300 may include user wallet 302 and a carbon offsetter wallet 310, which may correspond to user digital wallet 206 and carbon offsetter wallet 204, respectively, for cryptocurrency transaction processing with green transactions as discussed in reference to system environment 200 of FIG. 2.

In network 300, user wallet 302 may initially perform an interaction 5, where user wallet 302 is used to construct a cryptocurrency transaction via a layer one network for the corresponding cryptocurrency protocol. This may be for a payment or a transfer of cryptocurrency to another user and their corresponding digital wallet, which requires processing to validate and record on a distributed ledger for the blockchain via the layer one network, such as with one or more blockchain records or recording blocks. When constructing the cryptocurrency transaction for the layer one network, user wallet 302 identifies that one or more of the UTXOs for the cryptocurrency that is referred to as an input for the cryptocurrency transaction contains a two-of-two multi-signature locking script that includes a green address (e.g., a public key) of a carbon offsetter for carbon offsetter wallet 302. This designates the cryptocurrency transaction processed via the layer one network as a "green" transaction, which requires a payment to be made to carbon offsetter wallet 310 for processing the cryptocurrency transaction. In order to determine that the UTXOs make the cryptocurrency transaction a green transaction and the corresponding identification of the carbon offsetter and carbon offsetter wallet 310, user wallet 302 may perform a green address lookup with a public list of green addresses at interaction 5. This may then initiate the green wallet protocol and process in order to provide carbon offset fees via a layer two network, such as Lightning network 308, for cryptocurrency transaction processing via the layer one network.

At interaction 6, user wallet 302 identifies a carbon offset fee, a carbon offsetter wallet 310 and partially signs a carbon offset fee cryptocurrency transaction using the public key from the green address. This may include cryptographically signing using the public key so that the cryptocurrency transaction is verified for processing by user wallet 302. User wallet 302 may then send the partially signed transaction to green wallet 304 over a network connection for processing. This may be provided using a network for the cryptocurrency and through network communications. However, green wallet 304 is not the intended end recipient for the carbon offset fee cryptocurrency transaction instead the carbon offsetter wallet 310 is the intended end recipient and green wallet 304 serves as an intermediary wallet. Further at interaction 6, user wallet 302 calculates carbon adjusted or offset fees that are to be transferred, via the carbon offset fee cryptocurrency transaction to green wallet 304 via Lightning network 308. Green wallet 304 may then pay the carbon adjusted or offset fees to carbon offsetter wallet 310 via Lightning network 308. In this regard, using the green wallet protocol, a carbon offset fee may be calculated by determining an amount of cryptocurrency to pay carbon offsetter wallet 310 for processing the underlying cryptocurrency transaction on the layer one network.

At interaction 7.1 and 7.2, user wallet transmits (via Lightning network 308) and green wallet 304 then receives the carbon adjusted or offset fees that are designated for offsetting carbon emissions caused by processing the layer one cryptocurrency transaction. This may be received as an amount of cryptocurrency that is sent over Lightning network 308 for the carbon adjusted or offset fees. Internally, this may correspond to green wallet 304 generating and sending a Lighting network invoice for user wallet 302, which may then be mapped to the received carbon adjusted or offset fees that were transmitted over Lightning network 308. Thus, green wallet 304 may include an internal accounting and mapping process to identify the received fees as cryptocurrency and then later provide to carbon offsetter wallet 310 via Lightning network 308.

At interaction 8, green wallet 304 then validates the carbon adjusted or offset transaction fees that are paid via the layer two network for the cryptocurrency transaction on the layer one network. This may utilize the same or similar accounting or fee determination operations, which may be used to determine that the fee received is proper for the cryptocurrency transaction that is processed via the layer one network. If so, green wallet 304 then fetches the private key that corresponds to the green address (e.g., the private key for carbon offsetter wallet 310). Using the fetched private key, green wallet 304 may then further digitally sign the carbon offset fee cryptocurrency transaction using the private encryption key, such as by adding a cryptographic signature using the private key. This completes signing of the partially signed cryptocurrency transaction that requires the two-of-two multi-signature locking script. At interaction 9, green wallet 304 then transfers the carbon adjusted or offset transaction fees via the layer two network for Lightning network 308, such as a second amount of cryptocurrency for the offset fees to offset processing of the cryptocurrency transaction. The fees may be transmitted to carbon offsetter wallet 310 over Lightning network 308 or other layer two network so that carbon emissions are reduced and/or reversed by using carbon offsetting by a carbon offsetter. Further, by using Lightning network 308, less carbon emissions are used than using the layer one network.

Once transferred to carbon offsetter wallet 310, the carbon offset fee cryptocurrency transaction is then broadcast to the layer one blockchain network for the corresponding blockchain protocol of the cryptocurrency. Once broadcast, the mining computing nodes for the miners on the blockchain network for the cryptocurrency may then validate and record the carbon offset fee cryptocurrency transaction via the layer one network. In other embodiments, the broadcasting may be performed prior to transferring the carbon offset fee cryptocurrency transaction to carbon offsetter wallet 310 or simultaneous to the transfer of the carbon offset fee cryptocurrency transaction to carbon offsetter wallet 310.

Figure 4A:
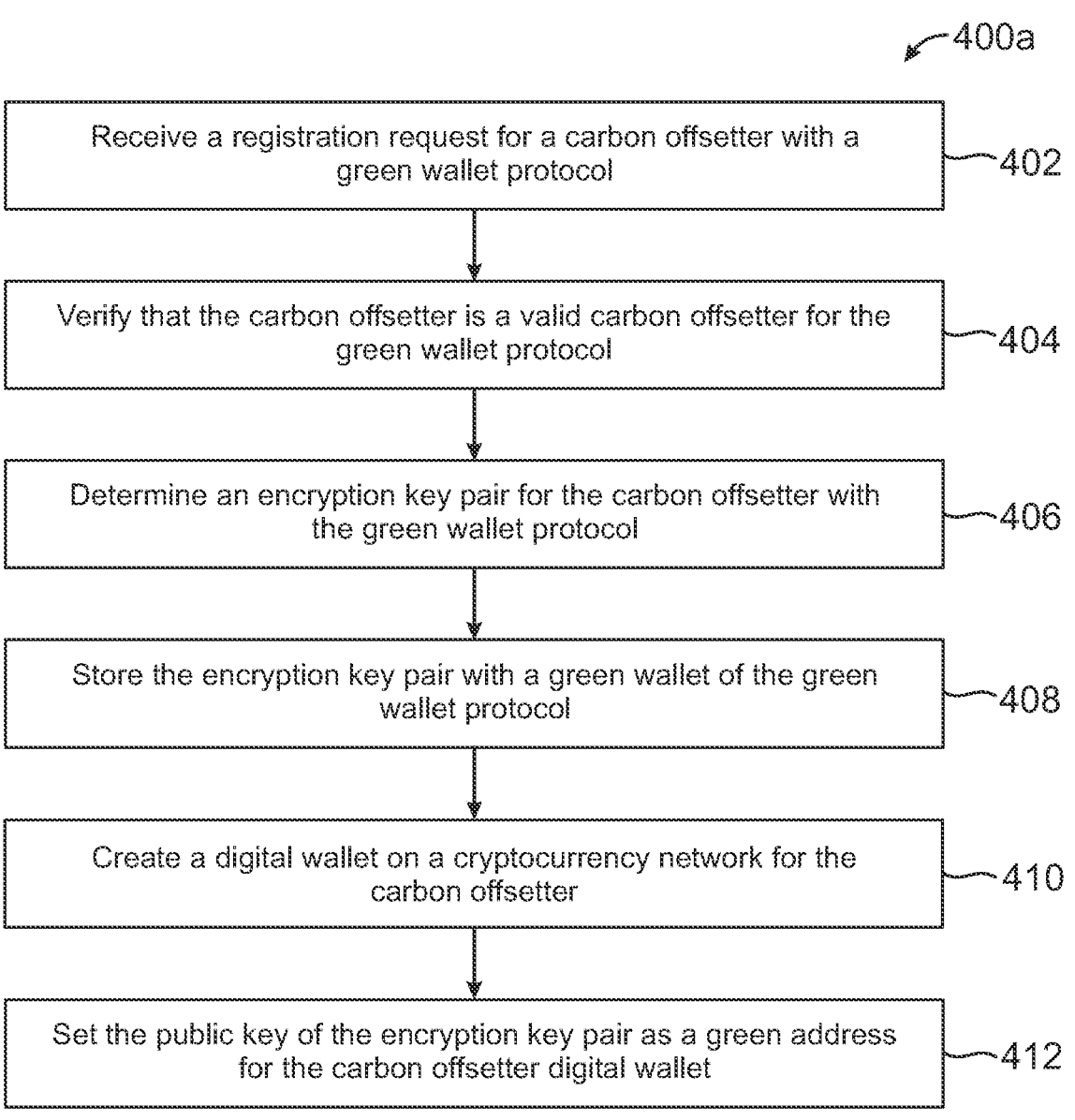
FIG. 4A is a flowchart of for processes used by a carbon offsetter to sign up on a carbon neutral blockchain protocol for resolving carbon offsetter payments for cryptocurrency transactions, according to an embodiment.

FIG. 4A is a flowchart 400a of processes used by a carbon offsetter to sign up on a carbon neutral blockchain protocol for resolving carbon offsetter payments for cryptocurrency transactions, according to an embodiment. Note that one or more steps, processes, and methods described herein of flowchart 400a may be omitted, performed in a different sequence, or combined as desired or appropriate.

At step 402 of flowchart 400a, a registration request for a carbon offsetter with a green wallet protocol is received. The registration request may be received to add the carbon offsetter as a valid carbon offsetter that may receive cryptocurrency payments on a layer two network to a digital wallet, such as a Lightning network with a Lightning wallet, when cryptocurrency transactions are processed on a layer one network (or other network) used by a blockchain protocol for a cryptocurrency. At step 404, it is verified that the carbon offsetter is a valid carbon offsetter. This may be done by verifying that the carbon offsetter is performing carbon offsetting validly and within the requirements for the green wallet protocol. When verifying that the carbon offsetter is a valid carbon offsetter, company formational and/or organizational documents may be used, as well as lookups in verified and validated carbon offsetter databases.

At step 406, an encryption key pair for the carbon offsetter with the green wallet protocol is determined. The encryption key pair may correspond to an asymmetric key pair, such as one having a public and private encryption key pair. The key pair may be used to sign cryptocurrency transactions and validate those transactions for processing over a layer one network for the cryptocurrency when a two-of-two multi-signature locking script is added to one or more UTXOs used as transaction input to a cryptocurrency transaction. In this regard, the public key of the key pair may then be designated as a green address of the carbon offsetter. At step 408, the encryption key pair is then stored with a green wallet of the green wallet protocol. The green wallet may correspond to a wallet and processing engine that may receive cryptocurrency transactions, sign such transactions using the private key, broadcast on the cryptocurrency's blockchain network, and transmit carbon offset fees over a layer two network to a carbon offsetter.

At step 410, a digital wallet is created on a cryptocurrency network for the carbon offsetter. The digital wallet may be created on a layer two network, such as a Lightning network, that may allow for cryptocurrency transaction processing and transmissions in order to provide fee payments for processing cryptocurrency transactions on a layer one network for the blockchain protocol. In this regard, the digital wallet for the carbon offsetter may be a Lightning wallet and may be generated for receive microtransaction or other transactions on the layer two network without requiring processing and validation on the layer one network, which would create carbon emissions from layer one network computing processing and usage by miner computing devices. At step 412, the public key of the encryption key pair is then set as a green address for the carbon offsetter digital wallet. The green address may then be used to look up and identify the carbon offsetter and the digital wallet for the carbon offsetter. Further, when set, the green address may be added to a public list of green addresses for verified carbon offsetters so that later the carbon offsetter may be looked up and/or selected for creating green transactions using cryptocurrency.

FIG. 4B is a flowchart 400b for a carbon neutral blockchain protocol for resolving carbon offsetter payments for cryptocurrency transactions that use cryptocurrency previously designated for a green transaction, according to an embodiment. Note that one or more steps, processes, and methods described herein of flowchart 400b may be omitted, performed in a different sequence, or combined as desired or appropriate.

At step 422 of flowchart 400b, an amount of a cryptocurrency transaction is designated, by a user of a first digital wallet, as a green transaction. This may be performed when a cryptocurrency transaction is initiated by the user with the first digital wallet, where the user's digital wallet (e.g., a sender's digital wallet) may be configured to be setup and interact with a green wallet on a layer two network (e.g., a Lightning network or other application level separate from a protocol level for the corresponding cryptocurrency). The first digital wallet may then be able to detect green addresses, select and/or initiate green transactions using a public list of green addresses, recognize two-of-two multi-signature locking scripts and digitally sign when recognized, and otherwise be compatible with a green wallet protocol. The request may be a request for cryptocurrency transaction processing for an amount of cryptocurrency to a recipient using the first digital wallet of a sender or transaction initiator. Thus, the transaction may include an amount of cryptocurrency to be paid or transferred to the recipient.

At step 424, the amount of cryptocurrency is transmitted to a second digital wallet via a layer one network. The layer one network may correspond to the protocol level network for the corresponding blockchain protocol, such as the Bitcoin network for transaction recordation, mining, proof of work, and Bitcoin creation. The second digital wallet may be a digital wallet of a recipient for the amount of cryptocurrency and may therefore receive the cryptocurrency when transmitted. Further, the second digital wallet may also be compatible with the green wallet protocol to interact with the green wallet via the layer two network, such as to facilitate carbon offset fee payments to carbon offsetters. At step 426, a request from a user of the second digital wallet to perform a cryptocurrency transaction with a third digital wallet is detected. The request may correspond to a cryptocurrency payment or transfer request from the second digital wallet to the third digital wallet. Thus, the request may attempt to pay or transfer some amount of cryptocurrency, e.g., have UTXOs or cryptocurrency private keys used in the transaction, that are designated or locked for green transactions using the green wallet protocol and green wallet via the layer two network.

At step 428, it is identified that the cryptocurrency transaction includes the amount of cryptocurrency that identifies a green address of a carbon offsetter. The amount of cryptocurrency may be the entire amount of cryptocurrency previously received by the second digital wallet from the first digital wallet, and therefore the full amount of the cryptocurrency from the first digital wallet that is designated for a green transaction. This may also further include additional cryptocurrency that may not have been from the first digital wallet and/or designated for a green transaction (e.g., additional, unmarked or locked, cryptocurrency for use with the green wallet and carbon offset payments). However, the amount may also be less than the entire amount previously received by the second digital wallet from the first digital wallet, such as portion of the amount previously received from the first digital wallet and designated for use with a green transaction. When identifying that the cryptocurrency transaction includes the green address, the green address may be tied to or associated with cryptocurrency input to the transaction, such as one or more of the UTXOs used as transaction input to the cryptocurrency transaction. Further, the UTXO(s) may further include a two-of-two multi-signature locking script that designates the transaction as a green transaction, where the script includes the green address to identify the carbon offsetter. At step 430, the amount of cryptocurrency for the cryptocurrency transaction is transmitted from the second digital wallet to the third digital wallet via the layer one network. The amount of cryptocurrency that is transferred therefore may include all or a portion of the cryptocurrency previously transmitted by the first digital wallet to the second digital wallet at step 424 and may therefore be previously designated for a green transaction by the first digital wallet when used in the cryptocurrency transaction between the second digital wallet and the third digital wallet.

At step 432, an offset fee for processing the cryptocurrency transaction via the blockchain protocol is determined. The offset fee is designated for processing via a layer two network, such as the Lightning network or other application level that resides on top of a protocol level for the cryptocurrency and may not require writing blockchain records to the protocol level blockchain for transaction recordation. The offset fee may be determined by determining an amount of funds (e.g., cash or other currency) and/or cryptocurrency that may be used by the carbon offsetter to provide carbon emission reduction or reversal that offsets the carbon emissions consumed or used by computing devices to process the cryptocurrency transaction via the layer one network. For example, the carbon offset fee may be calculated as a function of carbon emissions per average transaction on an hourly, daily, weekly, etc. level. The carbon offset fee may therefore correspond to an amount of cryptocurrency or other funds that provides a payment to reduce or reverse these carbon emissions by a carbon offsetter to approximately zero and therefore provide a carbon neutral output of the blockchain recordation and/or mining process. The fee may be recalculated based on changes to the carbon emissions over time, which may be based on the different amounts of electricity or power required by computing systems that persist records on the blockchain for the cryptocurrency (e.g., Bitcoin miners). Further, additional factors may also affect the carbon emissions and/or carbon offset fee calculation, such as based on items being purchased by the cryptocurrency in the cryptocurrency transaction, a merchant or entity receiving the cryptocurrency (e.g., the recipient), and identification of the sender of the cryptocurrency, and the like. These factors may account for carbon footprints and emissions of those items and/or parties to the cryptocurrency transaction. Thus, the carbon offset fee's amount may be dynamic and determined per transaction or may be periodically determined and applied to transactions occurring within a time frame.

Thus, the offset fee may provide a payment for use of carbon offsetting services by the carbon offsetter that are associated with the carbon footprint caused by processing the cryptocurrency transaction via the layer one network. At step 434, the cryptocurrency transaction is digitally signed using a public key associated with the green address. The green address may be the public key itself or may be used to look up and retrieve the public key from a public list of public keys for carbon offsetters. Thus, the public key may correspond to an encryption key that may be used to cryptographically sign the cryptocurrency transaction. This may be a partial signature requiring a second signature from a green wallet of the green wallet protocol in order to broadcast and process the cryptocurrency transaction.

At step 436, the signed cryptocurrency transaction is transmitted to the green wallet via a layer two network, such as a Lightning network. Thus, the green wallet may reside on the layer two network for processing of carbon offset fees. The cryptocurrency transaction is provided to the green wallet for transmission of an amount of cryptocurrency to a recipient's digital wallet, which may be recorded when processed via a layer one network of the blockchain protocol for the cryptocurrency. After receipt by the green wallet, the green wallet may broadcast the cryptocurrency transaction for the layer one network and process the offset fee to the carbon offsetter digital wallet via the layer two network. To resolve the carbon offsetting through the green wallet, at step 438, the carbon offsetter digital wallet on the layer two network is identified and the carbon offsetter is validated. This may be done using the green address of the carbon offsetter on the layer two network that was used with the cryptocurrency transaction processed via the layer one network. Additionally, a public list of green addresses may be used for carbon offsetter look up and validation. At step 440, the green wallet further digitally signs the cryptocurrency transaction with a private key of the carbon offsetter. The green wallet may look up the private key using the public key and/or green address on the layer two network, where the private key is securely stored by servers of the green wallet. The private key is used to complete digital signatures needed for the cryptocurrency transaction, where the completed signed cryptocurrency transaction is then used by the green wallet.

At step 442, cryptocurrency for the carbon offset fee is transmitted to the carbon offsetter digital wallet via the layer two network. The cryptocurrency may correspond to an amount of cryptocurrency provided over a layer two network to the digital wallet of the carbon offsetter via the layer two network, which provides a fee to offset carbon used when processing the underlying cryptocurrency transaction via the layer one network. Providing the carbon offset fee may occur without the layer one network, thereby saving processing and resource cost from use of the protocol level processing for the cryptocurrency. At step 444, the signed cryptocurrency transaction is broadcasted via a layer one cryptocurrency network of the blockchain protocol. Broadcasting may correspond to transmitting, or causing to be transmitted, an amount of cryptocurrency for the cryptocurrency transaction to the recipient digital wallet, which provides the payment or transfer for the cryptocurrency transaction from the sender to the recipient.

FIG. 4C is a flowchart 400c for a carbon neutral blockchain protocol for resolving carbon offsetter payments for cryptocurrency transactions designated for a green transaction during transaction processing, according to an embodiment. Note that one or more steps, processes, and methods described herein of flowchart 400c may be omitted, performed in a different sequence, or combined as desired or appropriate.

At step 446, a request to transmit a cryptocurrency transaction is received from a user digital wallet to a recipient digital wallet via a layer one network. The request may correspond to a cryptocurrency transaction, such as a payment or a transfer of the amount of cryptocurrency, for items, goods, services, or the like. The request may therefore be initiated through the user digital wallet of the user or sender of the amount of cryptocurrency. The user digital wallet may be compatible with a green wallet protocol for a green wallet on a layer two network. This allows the user digital wallet to designate the amount of cryptocurrency as a green transaction and for use with the green wallet on the layer two network for paying carbon offset fees. Further, the recipient digital wallet may be compatible, or may be onboarded to be compatible, with the green wallet protocol for processing carbon offset fee payments.

At step 448, a selection to process the cryptocurrency transaction as a green transaction is received in the user digital wallet. The cryptocurrency transaction may be designated as a green transaction by the sender of the cryptocurrency, such as by the sender entering a green address or selecting the green address from a list (e.g., a public list of green addresses) in the user digital wallet that initiate the cryptocurrency transaction. Thus, the sender may initiate the cryptocurrency transaction as a green transaction by selecting from an option and available green address in the user digital wallet that is compatible with the green wallet protocol. This cryptocurrency transaction is for resolution on the layer one network, such as a Bitcoin network or other protocol level for a cryptocurrency.

At step 450, the cryptocurrency transaction is transmitted to a recipient digital wallet via the layer one network. The amount of cryptocurrency for the cryptocurrency transaction is transmitted from the user digital wallet to the recipient digital wallet via the layer one network using the protocol level for the corresponding cryptocurrency, such as Bitcoin networks and distributed ledgers for recordation. At step 452, a carbon offset fee is identified, and the green transaction is then initiated via the layer two network. The carbon offset fee may be identified based on input by the sender with the user digital wallet, such as an amount the sender is paying for a carbon offset fee or may be determined in a similar manner to step 432. For example, the offset fee may be determined as a static or dynamic fee that may be based on an amount of a fiat currency and/or cryptocurrency that may be used for carbon emission reduction or reversal by a valid and/or registered carbon offsetter to offset carbon emissions caused by the cryptocurrency transaction. Where dynamic, the carbon offset fee may be a carbon emission cost function that is calculated at certain time intervals or periods, such as hourly, daily, weekly, etc.

Thereafter, steps 454 through 464 proceed in a similar manner to steps 434 through 444 from flowchart 400b of FIG. 4B using the user digital wallet, the recipient digital wallet, the green wallet, and the carbon offsetter digital wallet. For example, at step 454, the cryptocurrency transaction for the layer one network (e.g., that is processed between the sending user's digital wallet and the recipient user's digital wallet on the layer one network) is digitally signed using a public key associated with the green address. The user digital wallet may digitally sign the cryptocurrency transaction using the public key associated with the green address, where the user digital wallet is compatible with and utilizes the green wallet protocol for signing the cryptocurrency transaction using the public key. At step 456, the signed cryptocurrency transaction is transmitted to the green wallet via a layer two network for signing using a private key associated with the green address and carbon offsetter digital wallet. In flowchart 400c, the user digital wallet transmits the signed cryptocurrency transaction to the green wallet via the layer two network in order to be digitally signed by the green wallet using the private key.

At step 458, the carbon offsetter digital wallet on the layer two network is identified and the carbon offsetter is validated. Identification and validation of the carbon offsetter and corresponding digital wallet may be performed by the green wallet after receiving the signed cryptocurrency transaction from the user digital wallet. At step 460, the green wallet further digitally signs the cryptocurrency transaction with a private key of the carbon offsetter, which completes digital signatures required for the cryptocurrency transaction processed via the layer one network. This may be performed by retrieving the private key for the carbon offsetter using the public key and/or green address, as well as after identification and validation of the carbon offsetter and the corresponding digital wallet. At step 462, cryptocurrency for the carbon offset fee is transmitted to the carbon offsetter digital wallet via the layer two network. This cryptocurrency may correspond to an amount identified and/or determined from step 452, which is paid via the layer two network, thereby bypassing processing on the layer one network. At step 464, the signed cryptocurrency transaction is broadcasted via a layer one cryptocurrency network of the blockchain protocol. The green wallet may broadcast the signed cryptocurrency transaction to validate and record the cryptocurrency between the user digital wallet and the recipient digital wallet.

Figure 5:
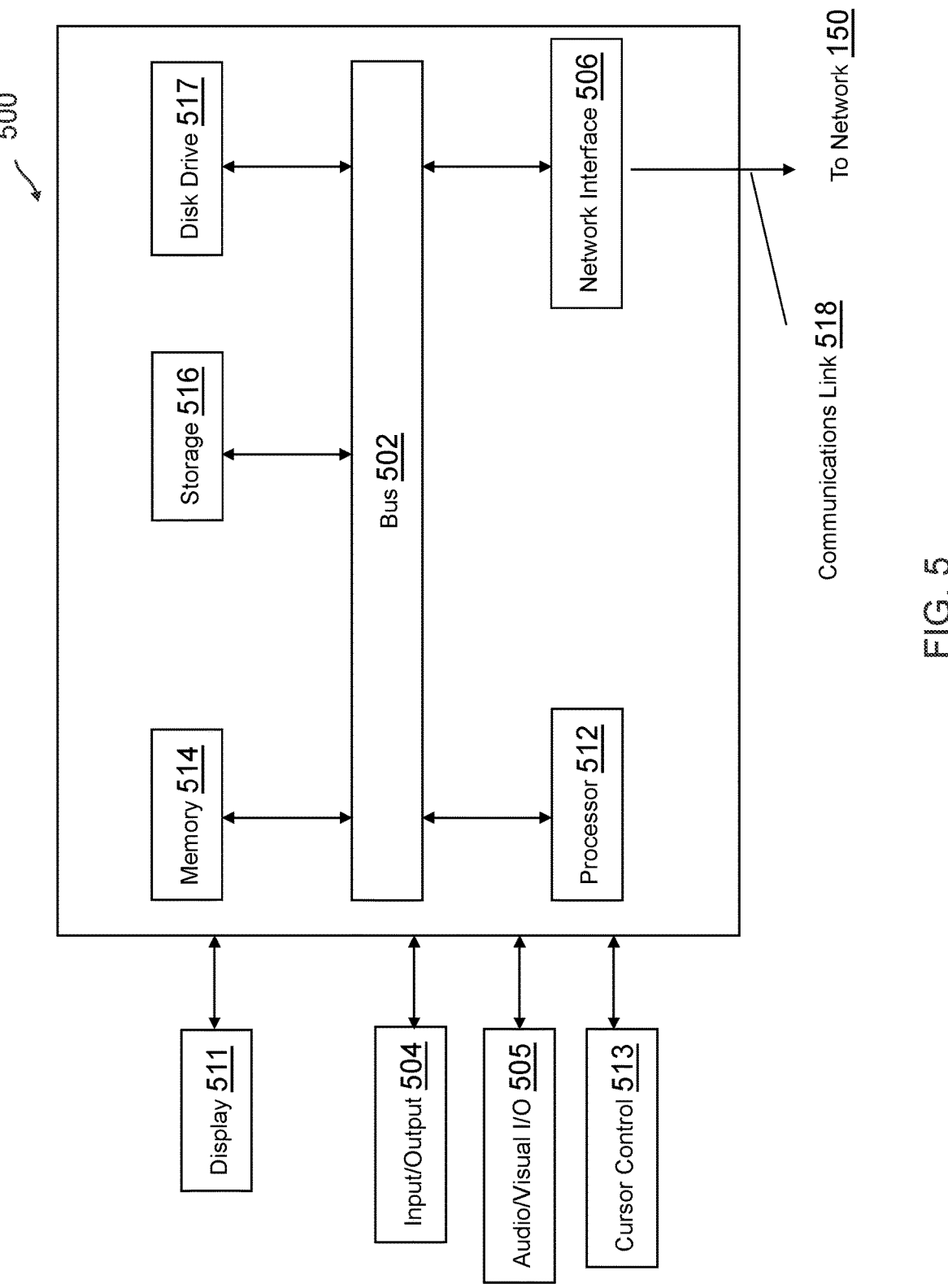
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/ visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing device system comprising:
a non-transitory memory; and
one or more hardware processors coupled to the non-transitory memory and configured to read instructions from the non-transitory memory to cause the computing device system to perform operations comprising:
receiving a transaction for processing an amount of a cryptocurrency on a blockchain protocol having a layer one network for cryptocurrency processing, wherein the blockchain protocol further has a layer two network;
determining that an unspent transaction output associated with the transaction includes a designation for a carbon offset fee payable to a carbon offsetter that resides on the layer two network;
identifying a green address associated with a green wallet, wherein the green address includes a public key, wherein the public key is paired with a corresponding private key that is stored on a server accessibly by the green wallet;
transmitting the carbon offset fee to the carbon offsetter after the private key has been used by the green wallet to digitally sign the transaction; and
transmitting the amount of the cryptocurrency to a recipient of the transaction on the layer one network.

2. The computing device system of claim 1, wherein the operations further comprise updating a public list of green addresses that includes the green address, wherein the updating is based at least in part on the public key.

3. The computing device system of claim 1, wherein the operations further comprise performing a verification validation of the carbon offsetter.

4. The computing device system of claim 1, wherein the green wallet resides on the layer two network.

5. The computing device system of claim 1, wherein the layer two network is associated with a green wallet network usable to generate encryption keys that include the public key and the private key.

6. The computing device system of claim 1, wherein the operations further comprise broadcasting the transaction on the layer one network after the transaction has been digitally signed.

7. The computing device system of claim 1, wherein the transaction is designated as a green transaction that enables the carbon offsetter to be used on the layer one network.

8. The computing device system of claim 1, wherein the unspent transaction output comprises a two-of-two multi-signature locking script.

9. A method comprising:

receiving, by a computing device, a transaction for processing an amount of a cryptocurrency on a blockchain protocol having a layer one network for cryptocurrency processing, wherein the blockchain protocol further has a layer two network;

determining, by the computing device, that an unspent transaction output associated with the transaction includes a designation for a carbon offset fee payable to a carbon offsetter that resides on the layer two network;

identifying, by the computing device, a green address associated with a green wallet, wherein the green address includes a public key, wherein the public key is paired with a corresponding private key that is stored on a server accessibly by the green wallet;

transmitting, by the computing device, the carbon offset fee to the carbon offsetter after the private key has been used by the green wallet to digitally sign the transaction; and transmitting, by the computing device, the amount of the cryptocurrency to a recipient of the transaction on the layer one network.

10. The method of claim 9, further comprising, by the computing device, updating a public list of green addresses that includes the green address, wherein the updating is based at least in part on the public key.

11. The method of claim 9, further comprising performing, by the computing device, a verification validation of the carbon offsetter.

12. The method of claim 9, wherein the green wallet resides on the layer two network.

13. The method of claim 9, wherein the layer two network is associated with a green wallet network usable to generate encryption keys that include the public key and the private key.

14. The method of claim 9, further comprising broadcasting, by the computing device, the transaction on the layer one network after the transaction has been digitally signed.

15. The method of claim 9, wherein the transaction is designated as a green transaction that enables the carbon offsetter to be used on the layer one network.

16. The method of claim 9, wherein the unspent transaction output comprises a two-of-two multi-signature locking script.

17. A non-transitory computer-readable medium having stored thereon instructions that, when executed by a processor, cause the processor to perform operations comprising:

receiving a transaction for processing an amount of a cryptocurrency on a blockchain protocol having a layer one network for cryptocurrency processing, wherein the blockchain protocol further has a layer two network;

determining that an unspent transaction output associated with the transaction includes a designation for a carbon offset fee payable to a carbon offsetter that resides on the layer two network;

identifying a green address associated with a green wallet, wherein the green address includes a public key, wherein the public key is paired with a corresponding private key that is stored on a server accessibly by the green wallet;

transmitting the carbon offset fee to the carbon offsetter after the private key has been used by the green wallet to digitally sign the transaction; and transmitting the amount of the cryptocurrency to a recipient of the transaction on the layer one network.

18. The non-transitory computer-readable medium of claim 17, wherein the operations further comprise updating a public list of green addresses that includes the green address, wherein the updating is based at least in part on the public key.

19. The non-transitory computer-readable medium of claim 17, wherein the operations further comprise performing a verification validation of the carbon offsetter.

20. The non-transitory computer-readable medium of claim 19, wherein the green wallet resides on the layer two network.

* * * * *